United States Patent
Huang et al.

(10) Patent No.: US 7,853,810 B2
(45) Date of Patent: Dec. 14, 2010

(54) CORE VOLTAGE CONTROLLING APPARATUS

(75) Inventors: Lan Huang, Shanghai (CN); Shih-Hao Liu, Shanghai (CN)

(73) Assignee: Inventec Corporation, Taipei (TW)

( * ) Notice: Subject to any disclaimer, the term of this patent is extended or adjusted under 35 U.S.C. 154(b) by 592 days.

(21) Appl. No.: 11/960,178

(22) Filed: Dec. 19, 2007

(65) Prior Publication Data

US 2009/0125731 A1    May 14, 2009

(30) Foreign Application Priority Data

Nov. 9, 2007    (TW) ............................... 96142492 A

(51) Int. Cl.
*G06F 1/26*    (2006.01)
(52) U.S. Cl. ................. 713/300; 713/320; 713/330; 713/340; 323/281; 323/282; 323/283; 323/284; 323/285; 327/376; 327/377
(58) Field of Classification Search ............. 713/300, 713/320, 330, 340; 323/281, 282, 283, 284, 323/285
See application file for complete search history.

(56) References Cited

U.S. PATENT DOCUMENTS

| | | | | |
|---|---|---|---|---|
| 4,963,769 A | * | 10/1990 | Hiltpold et al. | 365/185.18 |
| 5,175,845 A | * | 12/1992 | Little | 713/323 |
| 5,239,652 A | * | 8/1993 | Seibert et al. | 713/323 |
| 7,030,596 B1 | * | 4/2006 | Salerno et al. | 323/282 |

* cited by examiner

*Primary Examiner*—Nitin C Patel
(74) *Attorney, Agent, or Firm*—J.C. Patents

(57) ABSTRACT

A core voltage controlling apparatus suitable for a center processing unit (CPU) is provided. The apparatus includes a level shifting unit, a time-delay unit and a logic unit. An input terminal of the level shifting unit receives and shifts a first voltage signal, and an output terminal generates a second voltage signal, in which the first voltage signal indicates a power-on stable state, and the second voltage signal indicates a magnitude of the core voltage. The time-delay unit delays the second voltage signal to generate a third voltage signal. The logic unit is coupled to the time-delay unit for performing a logic operation on the third voltage and a fourth voltage signal transmitted by a power supply, and generating a fifth voltage signal for controlling a core voltage generator whether to provide the core voltage to the CPU or not, in which the fourth voltage signal indicates a power state.

6 Claims, 1 Drawing Sheet

CORE VOLTAGE CONTROLLING APPARATUS

CROSS-REFERENCE TO RELATED APPLICATION

This application claims the priority benefit of Taiwan application serial no. 96142492, filed on Nov. 9, 2007. The entirety of the above-mentioned patent application is hereby incorporated by reference herein and made a part of this specification.

BACKGROUND OF THE INVENTION

1. Field of the Invention

The present invention relates to a voltage controlling apparatus. More particularly, the present invention relates to a core voltage controlling apparatus for a central processing unit (CPU).

2. Description of Related Art

Once a computer system (or server) is booted, each component in the computer system (or server) is not powered on at the same time, but applied with the required voltage according to a common power-on procedure, in which a core voltage of the CPU is supplied at last. The above power-on procedure is sequentially listed as follows: firstly, the computer system (server) is powered on, next, after the voltage required by each component is stably applied, a power-on stable state signal is generated, and then, the power-on stable state signal is delayed to generate an enable signal for the core voltage of the CPU. Upon receiving the enable signal, the core voltage generator generates the core voltage to the CPU, so as to make the CPU work normally.

In addition, once the computer system (or server) is turned off or powered off, all the components are not powered off at the same time, but the voltage is stopped from being applied to each component one by one according to the power-on procedure, so as to make each component stop working. However, once the computer system (or server) is turned off, the core voltage of the CPU is not stopped on time, additional power consumption is resulted, and a part of the circuit still continuously operates, which may result in mis-operation of the circuit.

SUMMARY OF THE INVENTION

Accordingly, the present invention is directed to a core voltage controlling apparatus, capable of effectively stopping the core voltage supplied to the CPU immediately once the computer system (or server) is turned off or powered off, so as to reduce the power consumption and to avoid mis-operation of the circuit.

As embodied and broadly described herein, the present invention provides a core voltage controlling apparatus, suitable for the CPU. The core voltage controlling apparatus includes a level shifting unit, a time-delay unit, and a logic unit. An input terminal of the level shifting unit receives and shifts a first voltage signal, and an output terminal generates a second voltage signal, in which the first voltage signal indicates a power-on stable state, and the second voltage signal indicates a magnitude of the core voltage. The time-delay unit is used to delay the second voltage signal, so as to generate a third voltage signal. The logic unit is coupled to the time-delay unit, for performing a logic operation on the third voltage signal and a fourth voltage signal transmitted by a power supply, and generating a fifth voltage signal for controlling a core voltage generator whether to provide the core voltage to the CPU or not, in which the fourth voltage signal indicates a power state.

In an embodiment of the present invention, the level shifting unit includes a level shifter, a first resistor, a capacitor, and a buffer. The level shifter receives the first voltage signal, and determines whether to shift to a sixth voltage signal or not according to the level of the first voltage signal. A first terminal of the first resistor receives the sixth voltage signal, and a second terminal of the first resistor is coupled to the level shifter. A first terminal of the capacitor is coupled to the second terminal of the first resistor, and a second terminal of the capacitor is coupled to a ground voltage. An input terminal of the buffer is coupled to the first terminal of the capacitor, and an output terminal of the buffer generates the second voltage signal.

In an embodiment of the present invention, the level shifter includes a second resistor, a first transistor, a third resistor, a fourth resistor, and a second transistor. A first terminal of the second resistor receives the first voltage signal. A base terminal of the first transistor is coupled to a second terminal of the second resistor, and an emitter terminal of the first transistor is coupled to the ground voltage. A first terminal of the third resistor receives the sixth voltage signal, and a second terminal of the third resistor is coupled to a collector terminal of the first transistor. A first terminal of the fourth resistor is coupled to the second terminal of the third resistor. A base terminal of the second transistor is coupled to the second terminal of the fourth resistor, a collector terminal of the second transistor is coupled to the first terminal of the capacitor, and an emitter terminal of the second transistor is coupled to the ground voltage. In another embodiment of the present invention, the first transistor and the second transistor are NPN bipolar transistors.

In an embodiment of the present invention, the time-delay unit includes a fifth resistor and a second capacitor. A first terminal of the fifth resistor receives the sixth voltage signal, and a second terminal receives the second voltage signal. A first terminal of the second capacitor is coupled to the second terminal of the fifth resistor, and a second terminal is coupled to the ground voltage.

In an embodiment of the present invention, the logic unit includes a sixth resistor, a diode, and an AND gate. A first terminal of the sixth resistor receives the sixth voltage signal. An anode terminal of the diode is coupled to the second terminal of the sixth resistor, and a cathode terminal of the diode receives the fourth voltage signal. A first input terminal of the AND gate receives the third voltage signal, a second input terminal of the AND gate is coupled to the anode terminal of the diode, and an output terminal of the AND gate generates the fifth voltage signal.

In the present invention, the first voltage signal (the signal under the power-on stable state) is shifted and delayed, and then performed the logic operation with the fourth voltage signal (the voltage signal transmitted by the power supply), so as to generate the fifth voltage signal to serve as the reference for controlling the core voltage generator whether to provide the core voltage to the CPU or not. In this manner, the core voltage provided to the CPU can be effectively cut off immediately when the computer system (or server) is turned off or powered off in the present invention, so as to reduce the power consumption of the CPU, and to avoid the mis-operation of the circuit.

In order to make the aforementioned and other objects, features and advantages of the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
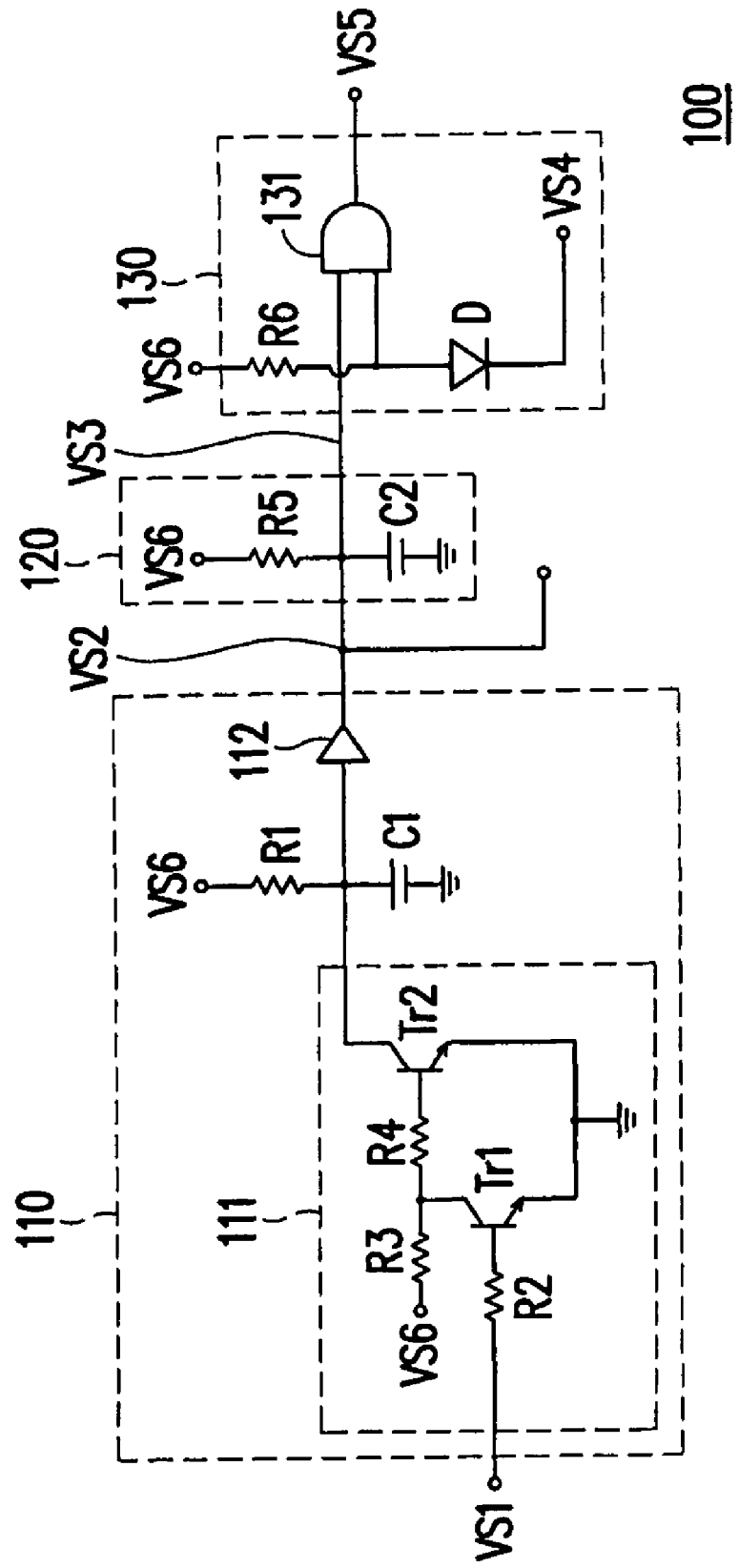
FIG. 1 is a circuit diagram of a core voltage controlling apparatus according to an embodiment of the present invention.

FIG. 1 is a circuit diagram of a core voltage controlling apparatus according to an embodiment of the present invention. A core voltage controlling apparatus 100 in this embodiment is suitable for a CPU (not shown). Referring to FIG. 1, the core voltage controlling apparatus 100 includes a level shifting unit 110, a time-delay unit 120, and a logic unit 130. An input terminal of the level shifting unit 110 receives a first voltage signal VS1 wherein the first voltage signal VS1 is delayed and shifted, and an output terminal of the level shifting unit 110 generates a second voltage signal VS2, in which the first voltage signal VS1 indicates a power-on stable state, and the second voltage signal VS2 indicates a magnitude of the core voltage.

The time-delay unit 120 is used to delay the second voltage signal VS2, so as to generate a third voltage signal VS3. The logic unit 130 is coupled to the time-delay unit 120, for performing a logic operation on the third voltage signal VS3 and a fourth voltage signal VS4 transmitted by a power supply (not shown), and generating a fifth voltage signal VS5 to a core voltage generator (not shown), and the fifth voltage signal VS5 serves as a reference for controlling the core voltage generator (not shown) whether to provide the core voltage to the CPU or not. That is to say, the core voltage generator determines whether to provide the required core voltage to the CPU or not according to the level of the fifth voltage signal VS5.

For example, if the fifth voltage signal VS5 is at a logic high voltage level, the core voltage generator provides the required core voltage to the CPU, so as make the CPU begin to work normally. If the fifth voltage signal VS5 is at a logic low voltage level, the core voltage generator immediately stops providing the core voltage to the CPU, so as to make the CPU stop working. In this embodiment, the fourth voltage signal VS4 is, for example, used to indicate a power state. That is, if the fourth voltage signal VS4 is at a logic high voltage level, it indicates that the power supply is activated and supplies the power. If the fourth voltage signal VS4 is at a logic low voltage level, it indicates that the power supply is turned off and does not supply the power.

Referring to FIG. 1, the level shifting unit 110 includes a level shifter 111, a resistor R1, a capacitor C1, and a buffer 112. The level shifter 111 receives the first voltage signal VS1, and determines whether to shift to a sixth voltage signal VS6 or not according to the level of the first voltage signal VS1.

For example, if the first voltage signal VS1 is at the logic low voltage level, the level shifter 111 correspondingly shifts the first voltage signal VS1 to the sixth voltage signal VS6. If the first voltage signal VS1 is at the logic high voltage level, the level shifter 111 correspondingly shifts the first voltage signal VS1 to the logic low voltage level.

In addition, the level shifter 111 further includes resistors R2 to R4 and transistors Tr1 and Tr2. A first terminal of the resistor R2 receives the first voltage signal VS1. A base terminal of the transistor Tr1 is coupled to a second terminal of the resistor R2, and an emitter terminal of the transistor Tr1 is coupled to the ground voltage GND. A first terminal of the resistor R3 receives the fifth voltage signal VS5, and a second terminal thereof is coupled to a collector terminal of the transistor Tr1. A first terminal of the resistor R4 is coupled to the second terminal of the resistor R3. A base terminal of the transistor Tr2 is coupled to the second terminal of the resistor R4, a collector terminal of the transistor Tr2 is coupled to the first terminal of the capacitor C1, and an emitter terminal of the transistor Tr2 is coupled to the ground voltage GND. In this embodiment, the transistors Tr1 and Tr2 are, for example, NPN bipolar transistors.

Accordingly, a first terminal of the resistor R1 receives the sixth voltage signal VS6, and a second terminal thereof is coupled to the level shifter 111. A first terminal of the capacitor C1 is coupled to the second terminal of the resistor R1, and a second terminal thereof is coupled to the ground voltage GND. An input terminal of the buffer 112 is coupled to the first terminal of the capacitor C1, and an output terminal thereof generates the second voltage signal VS2.

The time-delay unit 120 includes a resistor R5 and a capacitor C2. A first terminal of the resistor R5 receives the sixth voltage signal VS6, and a second terminal thereof receives the second voltage signal VS2. A first terminal of the capacitor C2 is coupled to the second terminal of the resistor R5, and a second terminal thereof is coupled to the ground voltage GND.

The logic unit 130 includes a resistor R6, a diode D, and an AND gate 131. A first terminal of the resistor R6 receives the sixth voltage signal VS6. An anode terminal of the diode D is coupled to the second terminal of the resistor R6, and a cathode terminal thereof receives the fourth voltage signal VS4. A first input terminal of the AND gate 131 receives the third voltage signal VS3, a second input terminal of the AND gate 131 is coupled to the anode terminal of the diode D, and an output terminal of the AND gate 131 generates the fifth voltage signal VS5.

During the overall operations of the circuit, firstly, when the first voltage signal VS1 (i.e., the signal at the power-on stable state) is at the logic high voltage level, for example, 1.1 V, the transistor Tr1 is turned on, and the sixth voltage signal VS6 is coupled to the ground through the resistor R3, such that the transistor Tr2 is not turned on. Since the transistor Tr2 is not turned on, the sixth voltage signal VS6 is output through the resistor R1 and the buffer 112, such that the second voltage signal VS2 generated by the level shifting unit 110 is at the logic high voltage level. Then, the second voltage signal VS2 is input to the CPU (not shown), for indicating the magnitude of the core voltage for the CPU. In addition, the second voltage signal VS2 is delayed through the time-delay unit 120 to generate the third voltage signal VS3 to be input to the first input terminal of the AND gate 131.

On the other aspect, if the fourth voltage signal VS4 is also at the logic high voltage level, it indicates that after the computer system (or server) is booted, the power supply begins to supply the power, such that the diode D is not turned on. At this time, the voltage signals received by the first input terminal and the second input terminal of the AND gate 131 are both at logic high voltage level, so the fifth voltage signal VS5 output at the output terminal of the AND gate 131 is at the logic high voltage level. The fifth voltage signal VS5 is, for example, an enable signal of the core voltage for the CPU, and meanwhile, the core voltage generator provides a corresponding core voltage to the CPU according to the voltage level of the fifth voltage signal VS5, so as to make the CPU work normally.

On the contrary, if a user suddenly turns off the power of the computer system (or server) by accident or a power failure suddenly occurs for the computer system (or server) (for example, failure of an electric power supply), it represents that the fourth voltage signal VS4 is shifted to the logic lower voltage level, the diode D is turned on, such that the signal received at the second input terminal of the AND gate 131 is at the logic low voltage level. Therefore, the first input terminal of the AND gate 131 is at the logic high voltage level, and the second input terminal is at the logic low voltage level, such that the fifth voltage signal VS5 output at the output terminal of the AND gate 131 is at the logic low voltage level.

Then, due to the fact that the fifth voltage signal VS5 is shifted to the logic low voltage level, the core voltage generator immediately stops providing the core voltage to the CPU, such that the CPU stops working. In this manner, the core voltage controlling apparatus 100 of this embodiment is surely capable of stopping providing the core voltage to the CPU immediately when the computer system (or server) is powered off or turned off, such that the CPU stops operating, so as to reduce the power consumption and to avoid mis-operation of the circuit.

To sum up, in the present invention, the first voltage signal (the signal at the power-on stable state) is shifted and delayed, and then the logic operation is performed on the fourth voltage signal (the voltage signal transmitted by the power supply), so as to generate the fifth voltage signal to serve as the reference for controlling the core voltage generator whether to provide the core voltage to the CPU or not. In this manner, the core voltage provided to the CPU can be effectively cut off immediately when the computer system (or server) is turned off or powered off in the present invention, so as to reduce the power consumption of the CPU, and to avoid the mis-operation of the circuit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A core voltage controlling apparatus, suitable for a central processing unit (CPU), comprising:
    a level shifting unit, having an input terminal for receiving and shifting a first voltage signal, and an output terminal for generating a second voltage signal, wherein the first voltage signal is used to indicate a power-on stable state, and the second voltage signal is used to indicate a magnitude of a core voltage;
    a time-delay unit, for delaying the second voltage signal to generate a third voltage signal; and
    a logic unit, coupled to the time-delay unit, for performing a logic operation on the third voltage signal and a fourth voltage signal transmitted by a power supply and generating a fifth voltage signal for controlling a core voltage generator whether to provide the core voltage to the CPU or not, wherein the fourth voltage signal indicates a power state.

2. The core voltage controlling apparatus as claimed in claim 1, wherein the level shifting unit comprises:
    a level shifter, for receiving the first voltage signal, and determining whether to shift to a sixth voltage signal or not according to the level of the first voltage signal;
    a first resistor, having a first terminal for receiving the sixth voltage signal and a second terminal coupled to the level shifter;
    a capacitor, having a first terminal coupled to the second terminal of the first resistor, and a second terminal coupled to a ground voltage; and
    a buffer, having an input terminal coupled to the first terminal of the capacitor, and an output terminal for generating the second voltage signal.

3. The core voltage controlling apparatus as claimed in claim 2, wherein the level shifter comprises:
    a second resistor, having a first terminal for receiving the first voltage signal;
    a first transistor, having a base terminal coupled to the second terminal of the second resistor, and an emitter terminal coupled to the ground voltage;
    a third resistor, having a first terminal for receiving the sixth voltage signal, and a second terminal coupled to a collector terminal of the first transistor;
    a fourth resistor, having a first terminal coupled to the second terminal of the third resistor; and
    a second transistor, having a base terminal coupled to the second terminal of the fourth resistor, a collector terminal coupled to the first terminal of the capacitor, and an emitter terminal coupled to the ground voltage.

4. The core voltage controlling apparatus as claimed in claim 3, wherein the first transistor and the second transistor are NPN bipolar transistors.

5. The core voltage controlling apparatus as claimed in claim 1, wherein the time-delay unit comprises:
    a fifth resistor, having a first terminal for receiving a sixth voltage signal, and a second terminal for receiving the second voltage signal; and
    a second capacitor, having a first terminal coupled to the second terminal of the fifth resistor, and a second terminal coupled to a ground voltage.

6. The core voltage controlling apparatus as claimed in claim 1, wherein the logic unit comprises:
    a sixth resistor, having a first terminal for receiving a sixth voltage signal;
    a diode, having an anode terminal coupled to the second terminal of the sixth resistor, and an cathode terminal for receiving the fourth voltage signal; and
    an AND gate, having a first input terminal for receiving the third voltage signal, a second input terminal coupled to the anode terminal of the diode, and an output terminal for generating the fifth voltage signal.

* * * * *